Nov. 1, 1938.   T. M. HARVEY   2,135,049
APPARATUS FOR STEREOSCOPIC CINEMATOGRAPHY
Filed March 10, 1937   3 Sheets-Sheet 1

INVENTOR
TED MAXWELL HARVEY
BY
Stebbins, Blenkor Parmelee
HIS ATTORNEYS

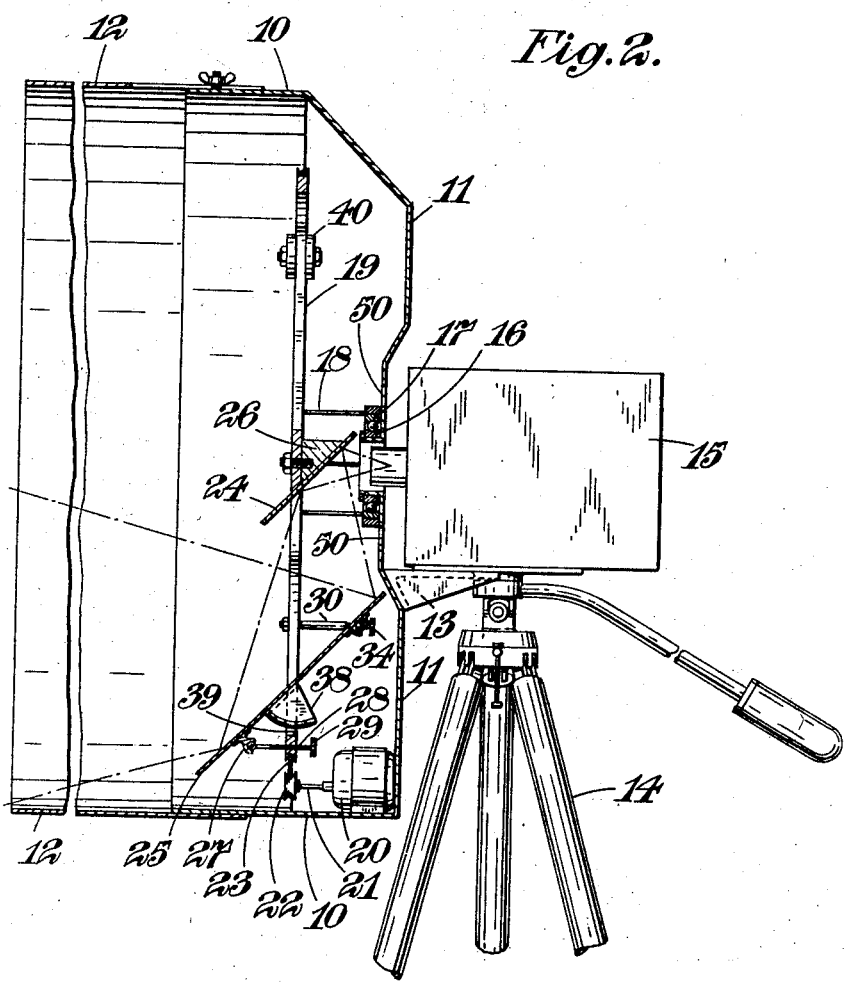

Nov. 1, 1938.  T. M. HARVEY  2,135,049
APPARATUS FOR STEREOSCOPIC CINEMATOGRAPHY
Filed March 10, 1937    3 Sheets-Sheet 3
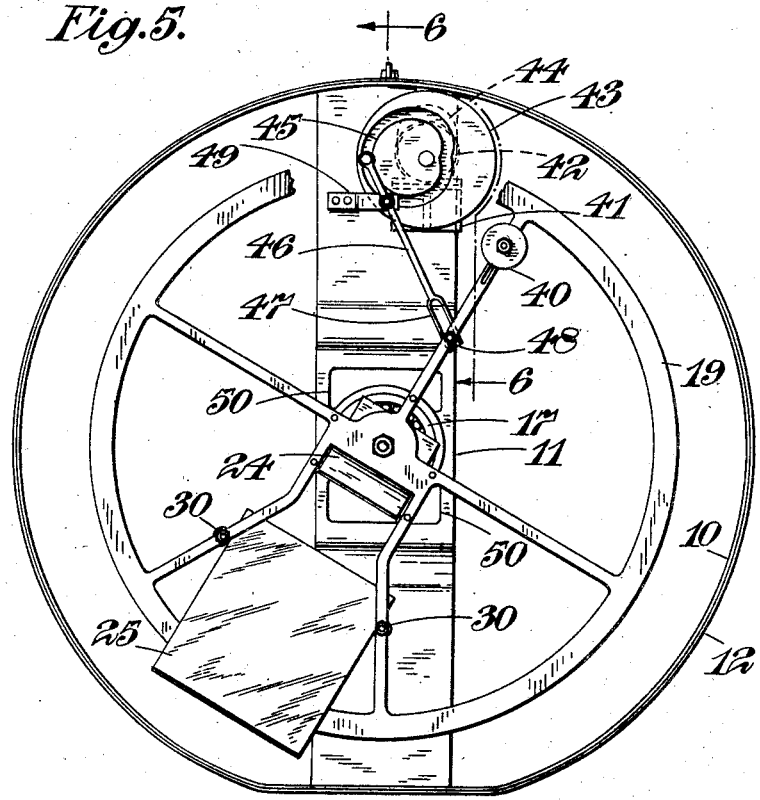
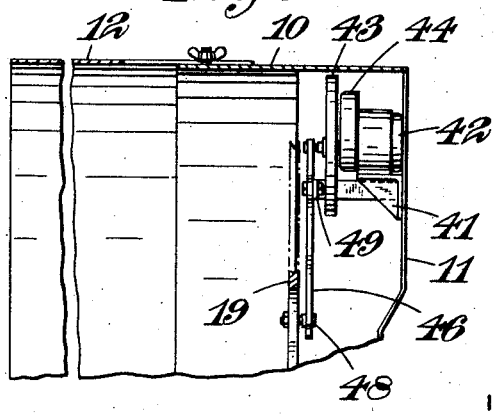
INVENTOR
TED MAXWELL HARVEY
By
Stebbing, Blenko & Parmelee
HIS ATTORNEYS Patented Nov. 1, 1938

2,135,049

UNITED STATES PATENT OFFICE 2,135,049

APPARATUS FOR STEREOSCOPIC CINEMATOGRAPHY

Ted Maxwell Harvey, London, England

Application March 10, 1937, Serial No. 129,992
In Great Britain October 2, 1936

4 Claims. (Cl. 88—16.6)

This invention is for improvements in or relating to stereoscopic cinematography and has for one of its objects to enable more realistic results to be obtained than has heretofore been found possible.

Another object of the present invention is to provide for taking a stereoscopic cinematograph by reflecting the image of the object to the lens by a reflector system including a reflector which is located out of the longitudinal axis of the camera lens and is so directed as to reflect an image of the object as viewed from said displaced position, and translating the said reflector about the said axis during the exposure while maintaining the continuity of reflection of the image from the object towards the lens. It will be appreciated that as the result of carrying out this method the camera lens and therefore the sensitive film will receive images of the object taken from a succession of positions displaced from the longitudinal axis of the lens, and it will be found that pictures taken according to the present invention not only show the depth of any individual object photographed but also show the distance between that object and other objects in the picture as measured in the general direction away from the camera. In other words, a very close approximation is obtained to the stereoscopic effect of the two eyes of an observer.

A further object of the invention is to provide apparatus comprising a reflector system embodying a reflector to be located obliquely across the longitudinal axis of the camera lens and facing the lens, and a second reflector located out of the said longitudinal axis and facing the first reflector and also facing the object to be photographed, means for adjusting the setting of the second reflector angularly with respect to the said axis and means for mounting the reflector system so that it can be rotated or oscillated as a unit about the said axis. As the reflector system is moved as a unit it will be appreciated that continuity of reflection of the image from the object towards the lens is maintained.

For a more complete understanding of the invention there will now be described, by way of example only and with reference to the accompanying drawings, certain constructional forms of apparatus according to the invention. It is to be understood, however, that the invention is not restricted to the precise constructional details set forth.

In these drawings—

Figure 2 is a sectional view on the line 2—2 of Figure 1 showing also a camera and a part of its tripod on which the apparatus according to the present invention is assembled in operative position;

Figure 5 is a view corresponding to Figure 1 but showing a modified construction, and Figure 6 is a detail view in section on the line 6—6 of Figure 5.

Like reference numerals indicate like parts throughout the drawings.

Figure 1:
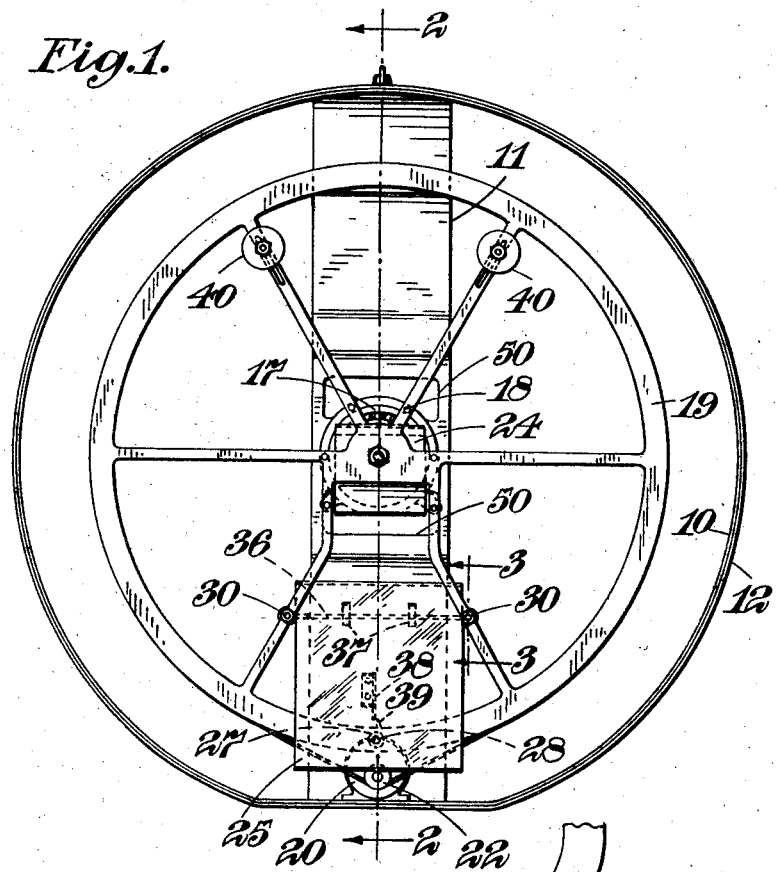
Figure 1 is a front view of one construction of apparatus according to the invention.
Figure 3:
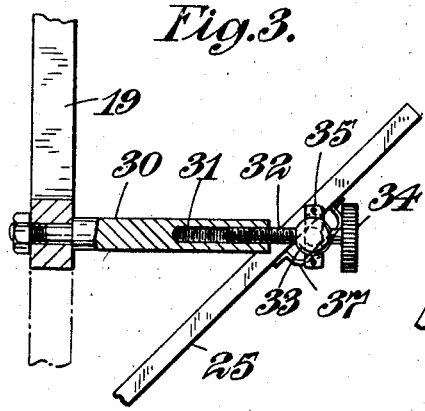
Figure 3 is an enlarged sectional view on the line 3—3 of Figure 1.
Figure 4:
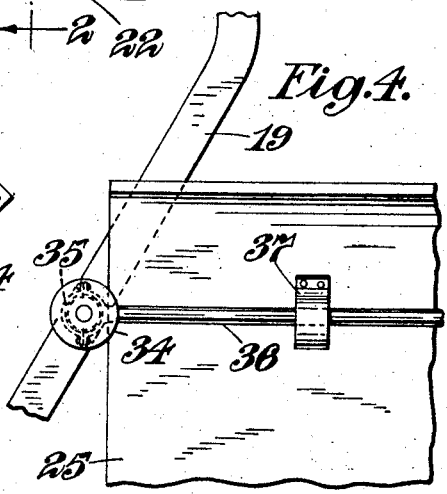
Figure 4 is a rear view of the parts shown in Figure 3.

Referring firstly to Figures 1 to 4, the construction therein illustrated comprises a casing having a rim 10 whereof the front is completely open and the back has a strip 11 extending diametrically across the casing. An adjustable screening extension for the front of the casing is shown at 12. The back strip 11 is provided with a rearwardly-extending bracket 13 by which the apparatus can be mounted on a camera tripod 14. A camera is shown at 15.

Inside the casing the back strip 11 carries the internal half 16 of an anti-friction bearing, the external half 17 of which is carried by struts 18 extending from a light wheel 19. Supported inside the casing is a motor 20 of any suitable character whereof the shaft 21 carries a pulley 22 which drives the wheel 19 by a belt 23.

As already explained, an image of the object to be photographed is reflected to the camera lens by a reflector system. This comprises a reflector 24 located obliquely across the longitudinal axis of the camera lens and facing the lens and a second reflector 25 located out of the longitudinal axis of the camera lens and facing the reflector 24 and also facing the object to be photographed. The reflector 24 is carried by the wheel 19 by means of a block 26 which is such that the surface of the reflector 24 lies at an angle of 45° to the longitudinal axis of the camera lens. This is a convenient angle for most conditions but other angles may be chosen, if desired, and instead of the fixed support 26 an adjustable support may be employed if desired.

The reflector 25 is supported on the wheel 19 by an adjustable three-point suspension. One of these suspension points comprises a cup 27 carried on the back of the reflector and receiving the ball-shaped end of a screwthreaded rod 28 which screws into the rim of the wheel 19 and has a knurled head 29. The other two suspension points are like each other but are different from the one just described. Each of the said other two suspension points comprises a standard 30 projecting rearwardly from one of the spokes of the wheel 19. The end of the standard is bored and screwthreaded at 31 to receive the screwed end 32 of a rod which is formed with a ball 33 and a knurled head 34. The ball 33 is encircled by a split cup 35 situated at the end of a rod 36 which reaches right across the back of the reflector 25. Elongated clips 37 secure the rod 36 to the reflector 25 but permit of relative movement consequent upon adjustment of the suspension points. This three-point suspension permits the reflector 25 to be angularly adjustable in every direction and in this way the proper setting of the reflectors 24 and 25 in relation to each other can be chosen, say, by manipulating the two screwed rods 32 and the desired setting of the reflector 25 with respect to the object to be viewed can be obtained by manipulating the screwed rod 28. To assist in the adjustment the reflector 25 is shown as being provided with a graduated scale 38 which can be read in conjunction with a pointer 39 on the wheel 19. This will indicate more or less exactly the setting required for an object at a specified distance from the observer.

Prisms or ordinary glass mirrors are not employed as the reflectors because owing to the fact that the light has to pass through the thickness of the glass in reaching and leaving the reflecting surface the image is apt to be blurred or duplicated or triplicated. In carrying out the invention the reflecting surface of the reflectors is that surface which faces the object in the one case and that surface which faces the lens in the other case. For instance, the reflectors may be made of glass, metal, porcelain or the like with a silvered surface directed as just stated. In such reflectors sharp images of the objects are readily obtainable.

The construction shown in Figures 1 to 4 is one in which the wheel 19 is continuously rotated by the motor 20. A convenient speed for ordinary cinematograph conditions, namely when twenty-four exposures are being made per second, is one revolution of the wheel 19 in thirty seconds when the reflector 25 is at a distance of thirteen inches from the longitudinal axis of the camera lens, but if part of the object is near to the camera and the background is distant it may be advisable to drive the wheel 19 at a slower speed. Various speeds may, of course, be chosen according to circumstances. To promote smoothness of movement of the wheel 19 balance weights 40 are shown attached to the spokes, they being adjustable to and from the axis of the wheel.

To set the apparatus for use the operator should see an image of the object in the reflector 24 and also by looking past the latter through a sighting aperture 50 in the back strip 11 see the actual object. He should adjust the setting of the reflector 25 until the image and the object appear to coincide, this being a kind of focussing operation. During and by virtue of his observations the operator is able to effect the necessary adjustment of the reflector 25 to set the apparatus for use. To assist in this, use may be made of the aforesaid graduated scale 38.

Instead of continuously rotating the wheel 19 it may be oscillated, a suitable construction for this purpose being shown in Figures 5 and 6. In this construction the back strip 11 of the casing carries a bracket 41 on which is supported a motor 42 of any suitable character which drives a disc 43 through a reduction gear 44. The forward face of the disc 43 is formed with a heart-shaped cam groove 45 with which there engages a roller carried on one end of a lever 46, the other end of which lever is forked at 47 to embrace a roller 48 carried on one of the spokes of the wheel 19. The lever 46 is pivoted on a bracket 49 carried by the back strip 11. This particular cam mechanism will impart to the wheel 19 an oscillation through about 60° and will ensure that the speed of movement is regular, but any other desired angle of oscillation may be chosen and any suitable mechanism employed for the purpose.

Instead of translating the reflector system about the longitudinal axis of the camera lens by power means, the latter may be omitted and the translation may be effected by hand, the operator merely having to pass his hand into the casing beside the back strip 11 and grasp one of the spokes or the rim of the wheel 19.

It will be appreciated that the actual construction of the apparatus can be varied in wide limits without departing from the invention.

I claim:

1. Apparatus for use in taking a stereoscopic cinematograph, comprising a casing, a bearing therein, a rotary framework supported in said bearing and located inside said casing, an external bracket on said casing whereby the latter may be carried on a camera support in such a position that the axis of rotation of the framework coincides with the longitudinal axis of the camera lens, a reflector on said framework in such a setting that it is located obliquely across the said axis and facing the lens, a second reflector on said framework in such a setting that it is located out of the said axis and facing the first reflector and also facing the object to be photographed, the reflecting surfaces of which first and second reflectors are those surfaces which face the lens in the case of the first reflector and face the object in the case of the second reflector, so that the light does not pass through the body of the reflectors, and means for adjusting the setting of the second reflector angularly with respect to said axis.

2. Apparatus for use in taking a stereoscopic cinematograph, comprising a casing, a bearing therein, a rotary framework supported in said bearing and located inside said casing, an external bracket on said casing whereby the latter may be carried on a camera support in such a position that the axis of rotation of the framework coincides with the longitudinal axis of the camera lens, a reflector on said framework in such a setting that it is located obliquely across the said axis and facing the lens, a second reflector on said framework in such a setting that it is located out of the said axis and facing the first reflector and also facing the object to be photographed, the reflecting surfaces of which first and second reflectors are those surfaces which face the lens in the case of the first reflector and face the object in the case of the second reflector, so that the light does not pass through the body of the reflectors, means for adjusting the setting of the second reflector angularly with respect to said axis, and power means carried by said casing for rotating the framework in the casing.

3. Apparatus for use in taking a stereoscopic cinematograph, comprising a casing, a bearing therein, a rotary framework supported in said bearing and located inside said casing, an external bracket on said casing whereby the latter may be carried on a camera support in such a position that the axis of rotation of the framework coincides with the longitudinal axis of the camera lens, a reflector on said framework in such a setting that it is located obliquely across the said axis and facing the lens, a second reflector on said framework in such a setting that it is located out of the said axis and facing the first reflector and also facing the object to be photographed, the reflecting surfaces of which first and second reflectors are those surfaces which face the lens in the case of the first reflector and face the object in the case of the second reflector, so that the light does not pass through the body of the reflectors, means for adjusting the setting of the second reflector angularly with respect to said axis, and power means carried by said casing for oscillating the framework in the casing through an angle of 60° about the longitudinal axis of the camera lens.

4. Apparatus for use in taking a stereoscopic cinematograph, comprising a reflector system embodying a reflector to be located obliquely across the longitudinal axis of the camera lens and facing the lens, a second reflector located out of the said longitudinal axis and facing the first reflector and also facing the object to be photographed, the reflecting surfaces of which first and second reflectors are those surfaces which face the lens in the case of the first reflector and face the object in the case of the second reflector, so that the light does not pass through the body of the reflectors, means for adjusting the setting of the second reflector angularly with respect to the said axis, and means for mounting the reflector system so that it can be translated rotatively as a unit about the said axis, which reflector system mounting is provided with a sighting aperture adjacent to the first reflector so that the operator can see an image of the object in the first reflector and also by looking past the latter through the sighting aperture in the said mounting can see the actual object and during and by virtue of these observations is able to effect the necessary adjustment of the second reflector to set the apparatus for use.

TED MAXWELL HARVEY.